United States Patent [19]
Kurowski et al.

[11] Patent Number: 6,009,172
[45] Date of Patent: Dec. 28, 1999

[54] METHOD AND APPARATUS FOR OPTIMIZING SCRAMBLING CONCEALMENT OF A VIDEO SIGNAL BY MODIFYING A SPECIALIZED SYNC PULSE

[75] Inventors: Kordian Kurowski, Mt. View; Ronald Quan, Cupertino, both of Calif.

[73] Assignee: Macrovision Corporation, Sunnyvale, Calif.

[21] Appl. No.: 08/877,061

[22] Filed: Jun. 17, 1997

[51] Int. Cl.[6] .................................................. H04N 7/167
[52] U.S. Cl. ............................................. 380/11; 380/15
[58] Field of Search ................................... 380/10, 11, 15

[56]       References Cited

U.S. PATENT DOCUMENTS 5,003,592   3/1991   Pires ........................................... 380/11

*Primary Examiner*—Tod R Swann
*Assistant Examiner*—Todd Jack
*Attorney, Agent, or Firm*—Gerow Brill; George Almeida

[57]       ABSTRACT

A technique for improving the scrambling concealment of a video signal and the like when displayed on a television set or monitor, includes the pulse width and/or pulse position modulation of a horizontal sync pulse in a horizontal blanking interval by time shifting the leading edge of the sync pulse while maintaining the trailing edge thereof stationary, by shifting the leading and/or trailing edge of the pulse, or by position modulating a sync pulse of specialized width. In modifications to the pulse width and pulse position modulation overlay techniques, the negative edge of the end of video lines may be modulated in the same way that the leading edge of the sync pulse is modulated, with the two edges locked together or modulated independently. Thus, the amount of position modulation of the horizontal sync pulse or its edge(s) is maximized so that the pertinent circuits of all television sets will always detect, and thus lock onto, the modulated or wobbling pulse width or pulse position modulated sync pulse. The embodiment in which the negative edges of the ends of video lines are modulated along with the sync pulses, insures that all television sets will lock onto a wobbling edge. This insures the concealment of the video signal, or equivalent signal, in all possible situations and for all types of television sets or monitors. An associated technique also is disclosed for descrambling the scrambled video signal when authorized.

47 Claims, 6 Drawing Sheets

METHOD AND APPARATUS FOR OPTIMIZING SCRAMBLING CONCEALMENT OF A VIDEO SIGNAL BY MODIFYING A SPECIALIZED SYNC PULSE

CROSS REFERENCE TO RELATED PATENTS AND APPLICATIONS

The present invention is related to commonly owned U.S. application Ser. No. 08/400,831, filed Mar. 8, 1995 entitled METHOD AND APPARATUS FOR SCRAMBLING AND DESCRAMBLING OF VIDEO SIGNALS WITH EDGE FILL.

BACKGROUND OF THE INVENTION

The invention relates to the scrambling concealment of a video or other time-domain information signal when displayed on a monitor or screen, to prevent unauthorized viewing thereof and, more particularly, to a technique for increasing the effectiveness of a horizontal sync overlay signal by selectively modulating a specialized sync pulse of the signal, to thereby maximize the concealment when the signal is displayed on any type of television set. The invention also includes an associated technique for demodulating the scrambled signal to provide a descrambled, viewable video signal when authorized.

There are various techniques used at present to provide scrambling concealment, and to provide descrambling, of a time domain information signal such as video signals. The purpose of such techniques is to prevent the unauthorized use of the signals. In the case of a video type of information signal, the unauthorized use which is prevented is the visual display of the signals for purposes of entertainment or instruction. Such signals are vulnerable to unauthorized use, for example, when they are broadcast over a satellite or microwave link, or when transported in the form of recordings on video tape, discs, and the like. It follows that it is highly desirable to prevent unauthorized users from successfully intercepting transmitted signals or from successfully viewing recorded signals.

To achieve the desired optimum results, a scrambling concealment technique must at least meet two conditions. First, the technique must always provide total and thus effective concealment of displayed pictures and, second, the technique must always work, that is, must always securely effect total concealment in all concealment situations and regardless of the types of monitors or television sets being used to view the signal.

Typical of present techniques for scrambling video signals to provide concealment thereof are those techniques known for example as video signal inversion, horizontal sync pulse suppression, interfering signal superimposed on the program video, video time line shifting or "wobbling", etc.

In the technique of video inversion, the video signal is "mapped" from white-to-black and vice versa or, in a color video signal, from a given color to its complementary color. Video inversion offers some concealment of the television picture but is ineffective, for example, for program material containing text.

Sync suppression of the horizontal sync pulses (H sync) is reasonably effective but the extent of its concealment is dependent upon scene content such as, for example, the average picture level. If the video inversion and/or sync suppression techniques are used together, the concealment may be less effective, especially when the techniques are used with "letter boxed" movies, because the properties of the inverted video in letter boxed movies may cause the pertinent circuits of the television set to use the stable letter boxed portion of the inverted video signal (for example, the top and bottom portions of the screen) rather than the unstable sync signal to provide a horizontal sync for the set. The properties of "letter boxed" movies are further explained below.

The technique of adding an interfering signal to the video signal to conceal it may be effective, but unscrambling the concealed video signal is very difficult. Thus the technique is impractical generally due to the resulting small nonlinearities generated throughout the television transmission and reception system.

A disadvantage of the line time shifting technique is that the scrambled signal is not completely concealed when viewed on a television set. That is, while very annoying, the resulting horizontally jumping picture still can be watched and partly understood by a determined viewer, whereby the technique does not provide an adequate level of concealment for all program material.

A majority of the above mentioned disadvantages of the various scrambling concealment techniques discussed above are overcome by, for example, the scrambling technique disclosed in the application Ser. No. 08/400,831, incorporated by reference, of previous mention. In this technique, the horizontal sync signal is time shifted, or "wiggled", to add a concealment overlay to the main time shifting scrambling system. That is, there is provided a further modification of the video signal, which obscures the picture when viewed prior to descrambling to thus prevent an unauthorized user from seeing a recognizable picture. A typical horizontal sync overlay scrambling technique includes an embodiment which involves time shifting the location of the horizontal sync pulse in each line of video in a pseudo random fashion from line to line. In a second embodiment, the sync pulse is time shifted in more complex fashion by the application of two genuinely random shifting patterns to thereby wiggle the sync pulse location from line to line in the more complex fashion.

This typical horizontal sync overlay scrambling technique likewise experiences various disadvantages. It was found that with some types of television (TV) sets, the wobbling effectiveness was related to the wobbling (modulating) frequency and to the wiggled horizontal sync pulse width and, of course, to the amount of sync pulse positional displacement. For example, since the standard horizontal sync pulse is about 4.7 microseconds ($\mu$s) in width and occurs during a standard 10.9±.2 $\mu$s horizontal blanking interval, there is a decided limitation on the degree of time shift that can be applied to the horizontal sync pulse on successive lines. For example, the available time shift may comprise±1.5 $\mu$s. It follows therefore that there is a decided limitation on the corresponding amount of positional displacement and thus of concealment that is imparted to the scrambled picture.

To get maximum effectiveness it would appear that using a horizontal sync pulse of very narrow width of about 2 to 2.3 $\mu$s will allow for the maximum wobbling displacement within the horizontal blanking interval and thus provide a corresponding maximum concealment of the signal. However, with more modern TV sets, for example the multiple television standard sets in existence today which employ very high speed horizontal automatic frequency control (AFC) circuits, a very narrowed wobbling horizontal sync can be construed by the pertinent AFC circuit of the TV sets as noise and thus ignored. The whole purpose of the horizontal sync overlay concealment is to have the modified horizontal sync pulses, that purposely are modulated, consistently be sync separated in the television set so that the AFC horizontal phase lock loop (H PLL) in the set always will lock onto the wobbling sync pulse to cause concealment of the signal when it subsequently is displayed on the TV set. It was found however, that if the modulated horizontal sync pulses are too narrow, the television set conceals very little due to the fact that the H PLL does not lock onto the very narrow sync pulses.

Some concealment is made possible when using the very narrow horizontal sync pulses, but these may have to be modulated at a substantially lower frequency. To illustrate the problem, in the instance where a television set locks onto the wobbling sync pulse and provides full concealment, the modulating frequency may be as high as 1000 Hz or higher. In a situation where a TV set construes the wobbling horizontal sync pulse as too narrow and doesn't lock onto the modulating frequency, minor concealment will occur if the frequency used is about 100 Hz to 1000 Hz. Even in this latter situation more of the concealment can be recovered by lowering the frequency of the horizontal sync position modulation to less than about 20 Hz (3 Hz to 10 Hz typical).

Thus, the above technique is not an optimal solution for increasing concealment for the types of TV sets of previous mention which don't respond well to very narrow wiggled horizontal sync pulses. Further, lowering the modulating frequency to recover some concealment means that small text or information on screen is not well concealed, because a higher frequency for the wiggled horizontal sync pulses is desirable when attempting to conceal text.

Accordingly, the problems of the scrambling concealment techniques first enumerated above, may be circumvented by the horizontal sync overlay technique discussed immediately above, wherein the horizontal sync pulse is selectively time shifted, but the width of the horizontal sync pulse is narrowed to on the order of 2 to 2.3 $\mu$s. The resulting available time shift, or pulse position modulation, within the horizontal blanking interval is of the order of ±2 $\mu$s which in most instances provides effective concealment of, for example, text in a scrambled video program signal. However, in a situation where the video inversion technique of previous mention is used alone or in combination with other scrambling techniques in concealing letter boxed movies or programs, the very narrow width horizontal sync pulse overlay technique proves to be inadequate when the movies are played on the certain types of television sets of previous discussion. Such television sets, including the multiple television standard types of sets mentioned above, respond to the letter boxed portion of a video signal as if it were the horizontal sync signal, rather than detecting and thus responding to the very narrow width horizontal sync pulse. That is, the wiggled horizontal sync pulse of narrowed width is not detected by the sync separator circuit of the television set when displaying the video signal. Instead, the sync separator circuit locks onto a stable portion of the letter boxed video signal, as is further described below. It follows that under these conditions, the scrambling horizontal sync overlay technique using a wiggled, very narrow sync pulse fails to consistently provide effective concealment of the corresponding displayed video signal.

Accordingly, it is highly desirable to provide a scrambling concealment technique in which effective concealment is assured in every situation and regardless of the type of television set used in an attempt to display the scrambled video signal.

SUMMARY OF THE INVENTION

The present invention provides a method and apparatus for overcoming the problems of previous discussion of the presently available prior art scrambling concealment techniques, wherein effective concealment of a video signal and the like is provided in all situations and for all types of television sets. The invention provides for pulse width or pulse position modification of specialized horizontal sync pulses in such fashion that all television sets or monitors will display video signals with positional dynamic shifting even in the presence of the troublesome video program material of previous discussion, including letter boxed video programs. To this end, the invention comprises an improved horizontal sync overlay technique which maximizes the amount of position modulation of a modified horizontal sync pulse when the associated signal is displayed on a television set while still insuring that the pertinent circuits of the television set always detect a modulated, or time shifted, horizontal sync pulse or a modulated edge of the end of the television line itself Thus the invention insures effective concealment of the video signal in all possible situations.

In a first embodiment, the invention insures that the TV set locks onto modulated horizontal sync pulses with maximum concealment over a range of modulation frequencies (for example, from about 200 Hertz [Hz] to about 1000 Hz) while using horizontal sync pulses which in effect are wider than the very narrow pulses of previous discussion. To this end, the pulse width is increased from the very narrow width of about 2.3 $\mu$s to what has been found to be a preferred width of about 3 $\mu$s or more, and the pulse time shifting, that is, pulse position modulation process, is selectively applied line-to-line to obtain picture concealment.

However, as discussed above, although the horizontal sync pulse is not the full standard width of 4.7 $\mu$s, the use of a pulse width of about 3 $\mu$s or more may cause a reduction in the amount of position modulation applied from line-to-line in order to prevent the wiggled sync pulse from encroaching the active video information in the lines preceding and following the horizontal blanking interval. Accordingly, to provide added positional displacement for the sync pulse, the number of cycles of color burst may be reduced from the normal 8 or 10 cycles to about 3 to 5 cycles, while the back porch which contains the shortened color burst may be reduced in width by several microseconds. This provides an increased time interval during the blanking interval of each television line for increased movement of the wider 3 $\mu$s sync pulse which, in turn, translates into increased positional displacement and thus increased concealment effectiveness of the picture on the television screen.

In an alternative embodiment in accordance with the invention, the disadvantages of the prior art very narrow sync pulse overlay technique, and of the wider 3 $\mu$s sync pulse of the invention technique are circumvented, while the advantages of each are exploited. To this end, the techniques are combined such that a very narrow sync pulse of for example 2.3 $\mu$s is position modulated from line-to-line for one or more consecutive fields or periods, and is subsequently followed by the position modulation of for example 3 $\mu$s sync pulses for one or more consecutive fields or periods. The resulting combination technique is responded to by the majority of television sets presently in use.

In another alternative embodiment, the invention provides for modification of horizontal sync pulses while maintaining effective concealment of the video signal, by pulse width modulating the leading edge, the trailing edge or both the leading and trailing edges of the horizontal sync pulse from about 6.9 $\mu$s through about 2.4 $\mu$s. It follows that the pulse width of the horizontal sync pulse is varied from a narrower than standard width through a greater than standard width, with the leading edge of the sync pulse modulated over a substantially increased time interval within the horizontal blanking interval. As mentioned above, the frequency of modulation may be selected in the range of about 200 to 1000 Hz, whereby the position displacement of the leading edge progresses from line-to-line. The associated color burst signal and the back porch width may, or may not, be narrowed to allow a proportionately greater sync leading edge time shift. The associated color burst also may be time shifted in the same manner as the pulse width modulated horizontal sync pulse overlay. Likewise, the color burst may be either time shifted or held in a fixed position in the pulse position modulated horizontal sync overlay process of previous mention. Since the horizontal sync pulse is modulated, for example, from about 6.9 $\mu$s through about 2.4 $\mu$s, the leading edge positional displacement (time shift) provides concealment at about 4 $\mu$s, or ±2 $\mu$s peak to peak displacement or greater. It follows that the horizontal pulse width is at least a minimum width of 2.4 $\mu$s for only a short time, and is much larger for a majority of the time, whereby most types of television sets will sense and therefor will lock onto, the leading edge of the horizontal sync pulse overlay which is being position modulated. This, in turn, insures that concealment of the video signal is provided on practically all television sets.

A modification of the invention, which positively insures concealment of the video signal in any situation and for every type of TV set, provides means for pre-blanking the horizontal blanking interval waveform, for example, 0.5 to 2 $\mu$s before the modulated leading edge of the horizontal sync pulse. That is, a blanking level of from 0% through about 20% of peak white level is set about 0.5 to 2 $\mu$s at the end of each active television line prior to the position modulated leading edge of the horizontal sync pulse. This pre-blanking modification also can be used with the pulse position modulating techniques of the invention described herein. The pre-blanking modification insures that all television sets sense the modulated leading edge of the horizontal sync pulse to provide the desired concealment, rather than lock onto, for example, a stable portion of a letter boxed video signal which would provide a stable horizontal sync and would defeat the desired video signal concealment.

A further modification to the pulse position and pulse width modulating techniques discussed above includes modulating not only the horizontal sync pulse, but also similarly modulating the negative edge of the end of the television line. The two edges of the video and the sync pulse may be locked at a selected interval from each other, for example between 0 and 2 $\mu$s, or may be modulated independently. Such a modification also insures that all television sets will lock to a modulated edge to insure concealment.

DETAILED DESCRIPTION OF THE PREFERRED EMBODIMENTS

Figure 1:
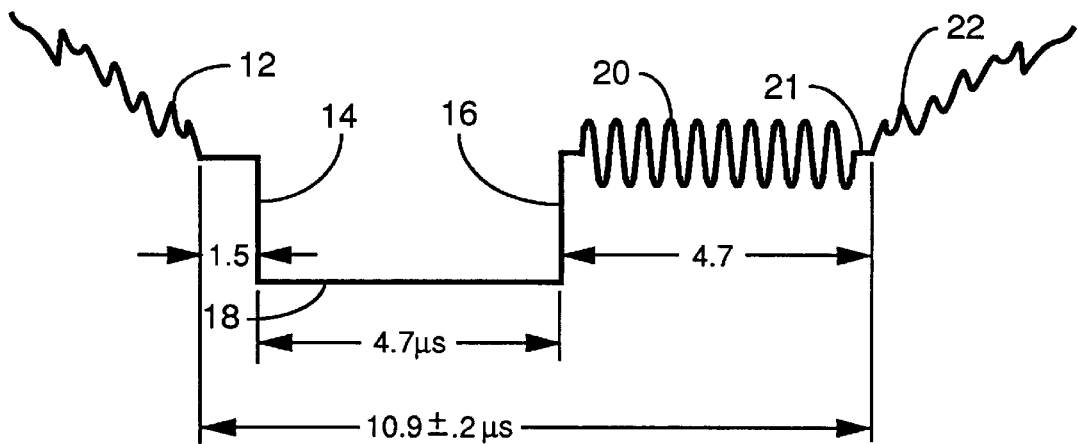
FIG. 1 is a waveform diagram illustrating a standard horizontal blanking interval in a line of video, including a standard horizontal sync pulse and color burst signal.

FIG. 1 depicts a standard horizontal blanking interval waveform, including an end of an active video line at 12, a front porch of about 1.5 $\mu$s, a beginning 14 and end 16 of a horizontal sync pulse 18, a color burst signal 20 located on a back porch interval 21, and the beginning of a subsequent active video line at 22. The time durations of the various portions of the waveform also are depicted, with the width of the standard horizontal sync pulse being 4.7 $\mu$s, the width of the horizontal blanking interval being 10.9±.2 $\mu$s and the color burst including about 10 cycles of 3.58 megahertz (MHz) color subcarrier frequency, fsc, during a 4.7 $\mu$s back porch interval.

Figure 2:
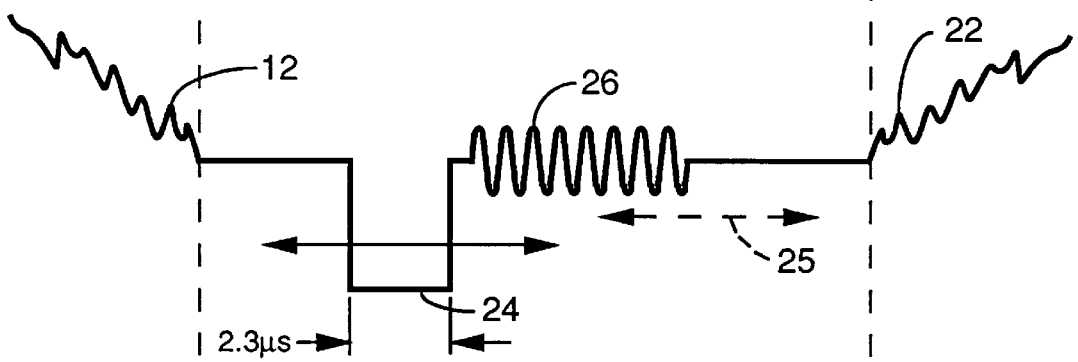
FIG. 2 is a waveform diagram illustrating a horizontal blanking interval but including a modified horizontal sync pulse of very narrow width of about 2.3 $\mu$s, which pulse is being time shifted (position modulated).

FIG. 2 depicts a prior art scrambling concealment technique of previous discussion above, wherein a horizontal sync pulse 24 is narrowed to a width of, for example, 2.3 $\mu$s and is position modulated over a time interval of about 3 to 5 $\mu$s. In order to maximize the time displacement for modulation of the pulse 24, an associated color burst signal 26 may be reduced for example, from the normal 10 cycles to about 8 cycles or less. As depicted by a dashed arrow 25, the color burst signal 26 may be modulated as well. Although this technique provides substantially effective concealment of the video signal in most situations, it is not always effective in instances where a video signal inversion scrambling technique is used with the letter boxed video material of previous mention.

Figure 3:
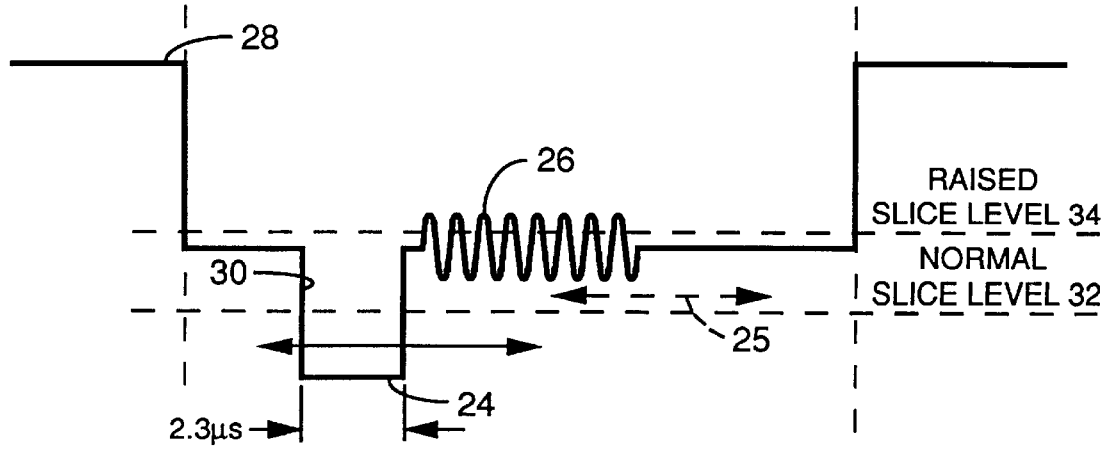
FIG. 3 is a waveform diagram illustrating the technique of FIG. 2 in a situation wherein a video inverted letter boxed signal provides an undesirably stable sync signal when the associated video signal is displayed on some types of television sets.

By way of explanation, in "letter boxed" movies the height-to-width moving picture format ratio of 3×5 or more is adapted to the conventional 3×4 television screen format by blacking out the top and bottom 20%, or more, of the television screen, whereby the central approximately 60% of the screen defines the 3×5 format for display of the movie. If such "letter boxed" movies are scrambled using the video inversion technique, the top and bottom 20% of the picture, which were at black level, are inverted by scrambling to peak white level. Thus, as depicted in FIG. 3, the last television lines 28 prior to a leading edge 30 of the horizontal sync pulse 24 are at peak white level. The resulting large amount of positive signal supplied to the sync separator circuit (further described below in FIG. 7) of a television set, will raise a normal slice level 32 of the sync separator. That is, if a very narrow horizontal sync pulse 24 of about 2.3 $\mu$s (FIG. 2) is used to provide scrambling, the presence of the preceding large video signal 28 of peak white causes the sync separator to raise the slice level to, for example, a level 34 above the level of the time shifted horizontal sync pulse 24, and into the stable portion of the letter boxed video, that is, into the video signal level. This in turn provides a stable horizontal sync pulse which defeats the horizontal sync overlay scrambling technique of, for example, FIG. 2.

Figure 4:
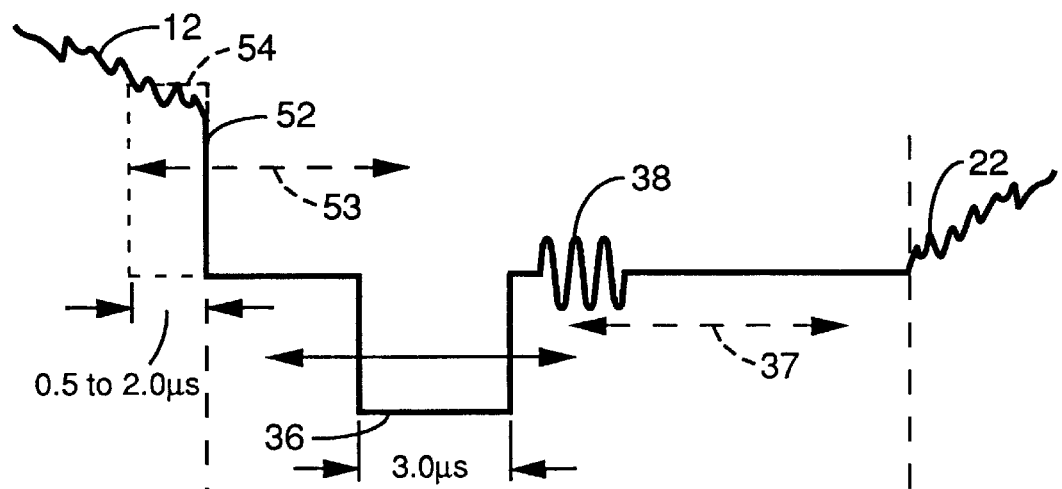
FIG. 4 is a waveform diagram illustrating a horizontal blanking interval modified in accordance with the invention, wherein a modified sync pulse has a less narrow width of about 3 $\mu$s or larger, wherein the pulse is being time shifted (position modulated).

FIG. 4 depicts a solution in accordance with an embodiment of the invention for the problems experienced by the very narrow horizontal sync pulse scrambling technique employing pulse position modulation, and depicted in FIGS. 2, 3. Thus, in FIG. 4 the width of a horizontal sync pulse 36 is increased from 2.3 $\mu$s to on the order of 3.0 $\mu$s or larger, and the sync pulse is position modulated or wiggled in the manner described in FIG. 2 to provide video signal concealment.

As previously mentioned, the increased width of 3.0 $\mu$s or more presents a problem in that it diminishes the amount of time interval available in the horizontal blanking interval for positional displacement of the sync pulse 36. Ergo, the ±2 $\mu$s of wiggle available for the 2 $\mu$s sync pulse of FIG. 2 may be reduced to about ±1 $\mu$s of position modulation or wiggle in FIG. 4. Accordingly, the number of cycles of a color burst signal 38 is reduced from 8 or 10 to about 3 to 5 cycles or less. In turn, this provides an additional interval within which the sync pulse 36 may be displaced, which further maximizes the degree of concealment. Accordingly, the modulated 3 $\mu$s horizontal sync pulse technique insures that the sync separator circuit will lock onto the wobbling sync pulse to provide concealment. The color burst signal 38 also may be position modulated as depicted by dashed arrow 37.

An alternative embodiment of the invention employs both of the scrambling techniques illustrated in the FIGS. 2 and 4 together, to thus take advantage of the preferred features of each. To this end, a sync overlay technique first selects a horizontal sync pulse of for example 2.3 $\mu$s width and position modulates the 2.3 $\mu$s sync pulse on successive television lines to produce a wobbling sync pulse which is position modulated over a time interval of at least ±2 $\mu$s. The 2.3 $\mu$s horizontal sync pulse may be applied for one field or frame, or for a selected number of fields or frames. The technique then switches to the wider horizontal sync pulse of 3 $\mu$s or more which then is position modulated from line-to-line over one or a selected number of fields or frames of the video signal. The 2.3 $\mu$s sync pulse mode provides a greater positional displacement of a concealed video signal, but may not be detected by certain types of TV sets. On the other hand, the 3 $\mu$s or wider sync pulse mode provides a correspondingly decreased positional displacement and thus deviation, but consistently is detected by a majority of TV sets. Accordingly, the unique combination of the two techniques circumvents the disadvantages of either technique when used alone, while exploiting the advantages of each. To illustrate, if a TV set is the type that won't respond to a very narrow 2.3 $\mu$s sync pulse, a loss of concealment results for a field or more. However, the switch to a less deviated but wider 3 $\mu$s sync pulse assures that the TV set now positively will detect and lock onto the wider sync pulse in the next field or fields to re-establish the concealment. The cumulative effect as viewed on the screen of the TV set is one of consistently effective concealment. Obviously, a combination of pulse widths other than 2.3 and 3 $\mu$s may be employed.

As mentioned, the switch between narrow and wider sync pulses may occur over field or frame time periods, or fractions of field or frame time periods. Likewise, the percentage of use of the narrow versus the wider sync pulses may be varied as desired. For example, during odd fields the narrow 2.3 $\mu$s sync pulse may be used, and during even fields the wider 3 $\mu$s pulse may be used. However, the selection of narrow versus wider sync pulse use may vary randomly, e.g., one field or frame of the narrow sync pulse may be used followed by three fields or frames of the wider sync pulse followed by five fields or frames of narrow sync pulse, etc. It may be seen that the combination scrambling technique insures that all types of TV sets respond to one or the other of the horizontal sync pulses to thereby consistently provide the desired signal concealment.

Figure 5:
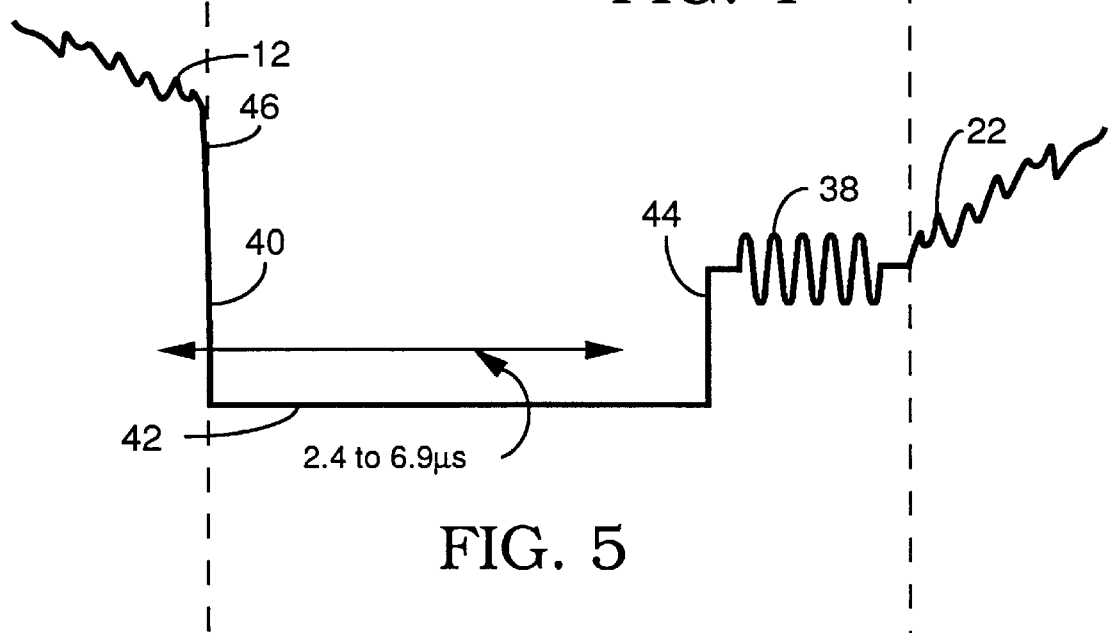
FIG. 5 is a waveform diagram of a modified horizontal blanking interval illustrating a pulse width modulated horizontal sync pulse in accordance with the invention, wherein the leading edge of sync is time shifted to provide the pulse width modulation.
Figure 6:
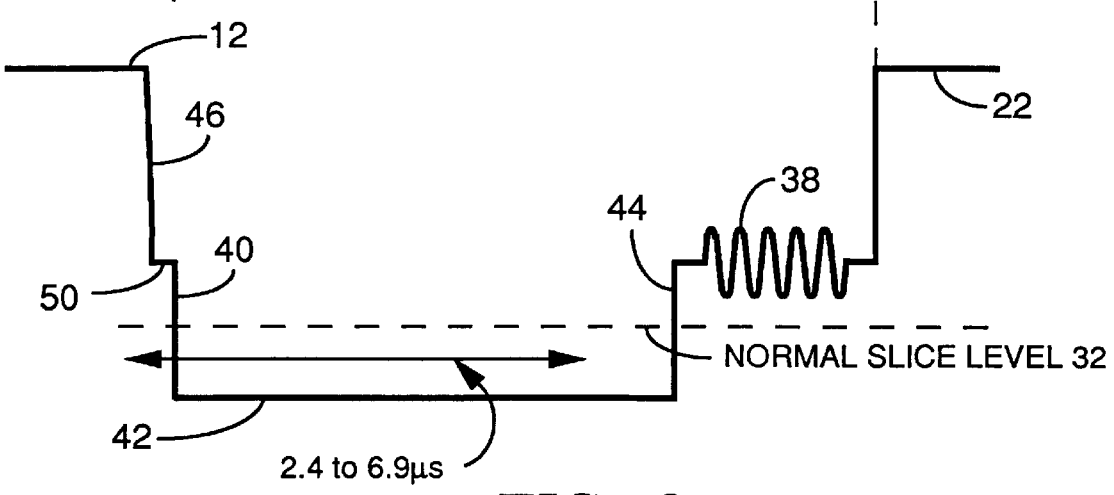
FIG. 6 is a waveform diagram illustrating a waveform similar to that of FIG. 5 but wherein the sync pulse is pre-blanked to insure concealment in letter boxed video situations such as illustrated in FIG. 3

A preferred alternative embodiment of the invention is illustrated in FIGS. 5 and 6. FIG. 5 employs a technique of pulse width modulation by specifically time shifting a leading edge 40 of a horizontal sync pulse 42 on successive or selected lines of the television signal. This allows the leading edge 40 to provide an increased horizontal sync pulse width while a trailing edge 44 of the sync pulse is kept stationary and stable. As may be seen, the width of the wiggled horizontal sync pulse 42 may vary from about 2.4 $\mu$s through 6.9 $\mu$s over a selected succession of television lines depending on the modulating frequency. Thus, the width of the sync pulse is greater than the desired minimum width of 2.4 to 3.0 $\mu$s most of the time. In addition, the amount of sync pulse positional displacement is maximized to provide on the order of a 4 $\mu$s or more displacement, which amounts to a leading edge time shift of ±2 $\mu$s or more peak to peak. This, in turn, provides an optimized positional displacement of the video signal when displayed on a TV set, with a corresponding increase in concealment. In addition, a majority of TV sets will consistently lock onto the position modulated leading edge of the horizontal sync pulse since the width of the sync pulse 42 always is greater than 2.4 $\mu$s.

Although the horizontal sync overlay technique of FIG. 5 provides almost totally effective concealment and security for a commercial scrambling system for the majority of types of TV sets presently in use, there exists a further situation when using the video signal inversion technique with a letter boxed video program or movie, which may result in the defeat of concealment. As partially discussed relative to FIG. 3 and as illustrated further in FIG. 5, a problem may arise in the event that a trailing edge 46 of a peak white video signal occurs coincidentally with the modulated leading edge 40 of the pulse width modulated horizontal sync pulse 42. In this situation, there are some TV sets such as those of previous discussion, whose sync separator circuit will lock onto the stable trailing edge 46 of the peak white video signal rather than on the modulated leading edge 40 of the unstable horizontal sync pulse 42. That is, the large amount of positive signal coincident with the leading edge of sync will equivalently raise the normal slice level of the sync separator circuit (FIG. 9) into the stable video signal level 34 as discussed relative to FIG. 3. It follows that in this situation such TV sets would fail to provide the desired video signal concealment.

FIG. 6 illustrates an alternative embodiment of the invention which circumvents the problem of previous mention which may arise in the situation illustrated in the embodiment of FIG. 5. To this end, the horizontal blanking interval waveform is further modified by pre-blanking an interval at the end of the last line 46 of video and prior to the leading edge 40 of the modulated horizontal sync pulse 42 by, for example, 0.5 μs to 2 μs. That is, as illustrated in FIG. 6, a front porch pre-blanking interval 50 is set to about 0% to about 20% of the peak white level during the last 0.5 to 2 μs of the active video line and prior to the leading edge 40 of the horizontal sync overlay. Alternatively, about the first 1 μs of the blanking interval may be set to the selected blanking level. This forces the sync separator circuit of all types of TV sets to lock onto the modulated leading edge 40 of the horizontal sync pulse 42 at the normal slice level 32 (see also FIG. 3). It follows that in the horizontal sync overlay technique of FIG. 6, effective concealment and positive security is provided for all TV sets presently in use, including the sets using the various television color standards such as NTSC, PAL and SECAM.

As previously mentioned, some TV sets adjust their sync slice point to the raised slice level (34 of FIG. 3) when they encounter non-standard sync patterns. As a result, they use the negative edge of the end of video/beginning of blanking to lock horizontally. If the active video 12 luminance level on the right side of the picture is higher than the raised slice level, then the modulated horizontal sync pulse is ignored by the TV set. This renders the horizontal overlay process ineffective.

Figure 7:
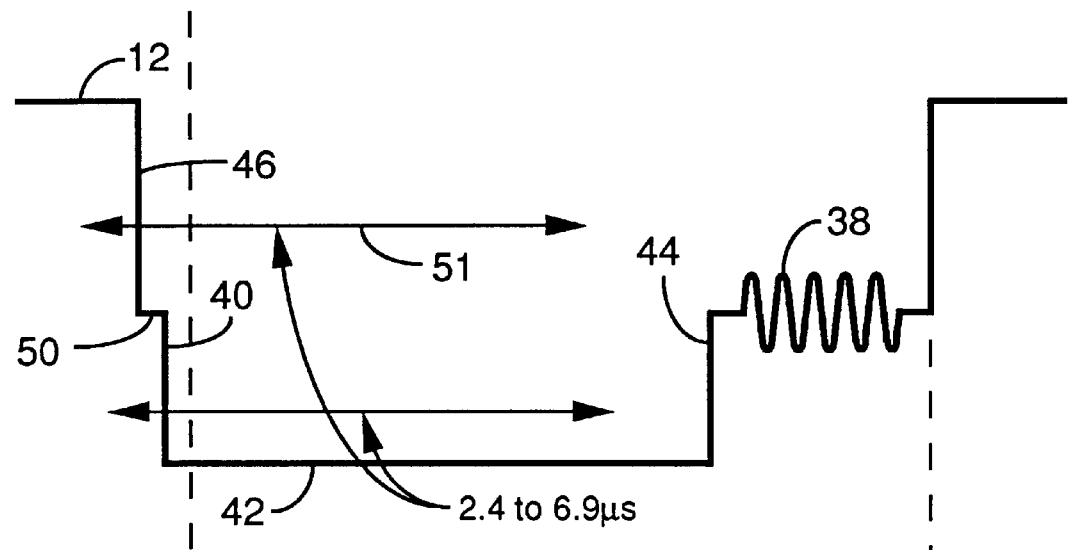
FIGS. 7 and 8 are waveform diagrams illustrating waveforms similar to that of FIG. 6 but wherein a modification of the invention employs the technique of modulating the negative edge of the end of the television line along with the horizontal sync pulse.
Figure 8:
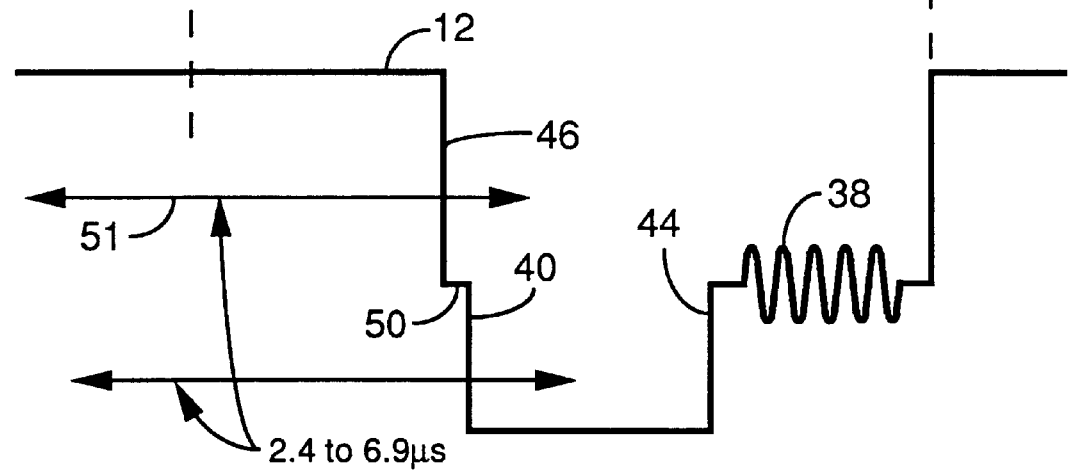

A further alternative embodiment of the invention, FIGS. 7, 8, offers another solution to this problem by position modulating the negative edge 46 of the end of the television line in a similar way that the leading edge of the sync pulse 40 is modulated. Since the edge 46 is modulating, the TV set construes it as a modulated sync pulse edge, which will conceal the picture. Thus, the video level of the end 46 of a line of active video 12 is modulated back and forth in a manner similar to the horizontal sync pulse leading edge 40, as depicted by arrow 51. Likewise, as shown in FIG. 4, an end 52 of a line of active video 12 may be modulated as depicted by the dashed arrow 53 along with the pulse 36 in the pulse position modulation embodiment. The two edges may be locked at a certain interval from one another, for example, between 0 and 2 μs, or they may be modulated independently. A simple way to modulate the blanking leading edge is to sample the active video near the end of each line and hold the sample value until the blanking leading edge occurs. That is, the pixel just prior to, for example, the last 2 μs of the TV line is replicated to fill in pixels before the pre-blanking interval as the sync pulse is pulse width modulated. This, in effect, stretches the video.

This concept also may be applied to the pulse position modulated horizontal sync version (see FIG. 4), using a pre-blanking duration of up to 2 μs with the position modulated sync pulse 36 of 3 μs, and extending the modulation into the last 2 μs of the active video line. Pixel replication may be used as previously discussed to fill in the signal as the position of the sync pulse is modulated into the horizontal blanking interval.

The resulting effect is that the horizontal overlay (especially the pulse width modulated horizontal sync version described herein) provides full concealment effect at any slice level. Therefore the TV sets that adjust their sync slice point are affected by the horizontal overlay process just as much as all other TV sets.

Regarding the edge fill process, a voltage around blanking level can be substituted instead. That is, the last 2 μs of the TV line can be near blanking level. This way, a pre-blanking duration is not needed. It would be preferable however to allow for at least 0.5 μs of near blanking interval before the leading edge of sync during the sync pulse width or pulse position modulation.

Figure 9:
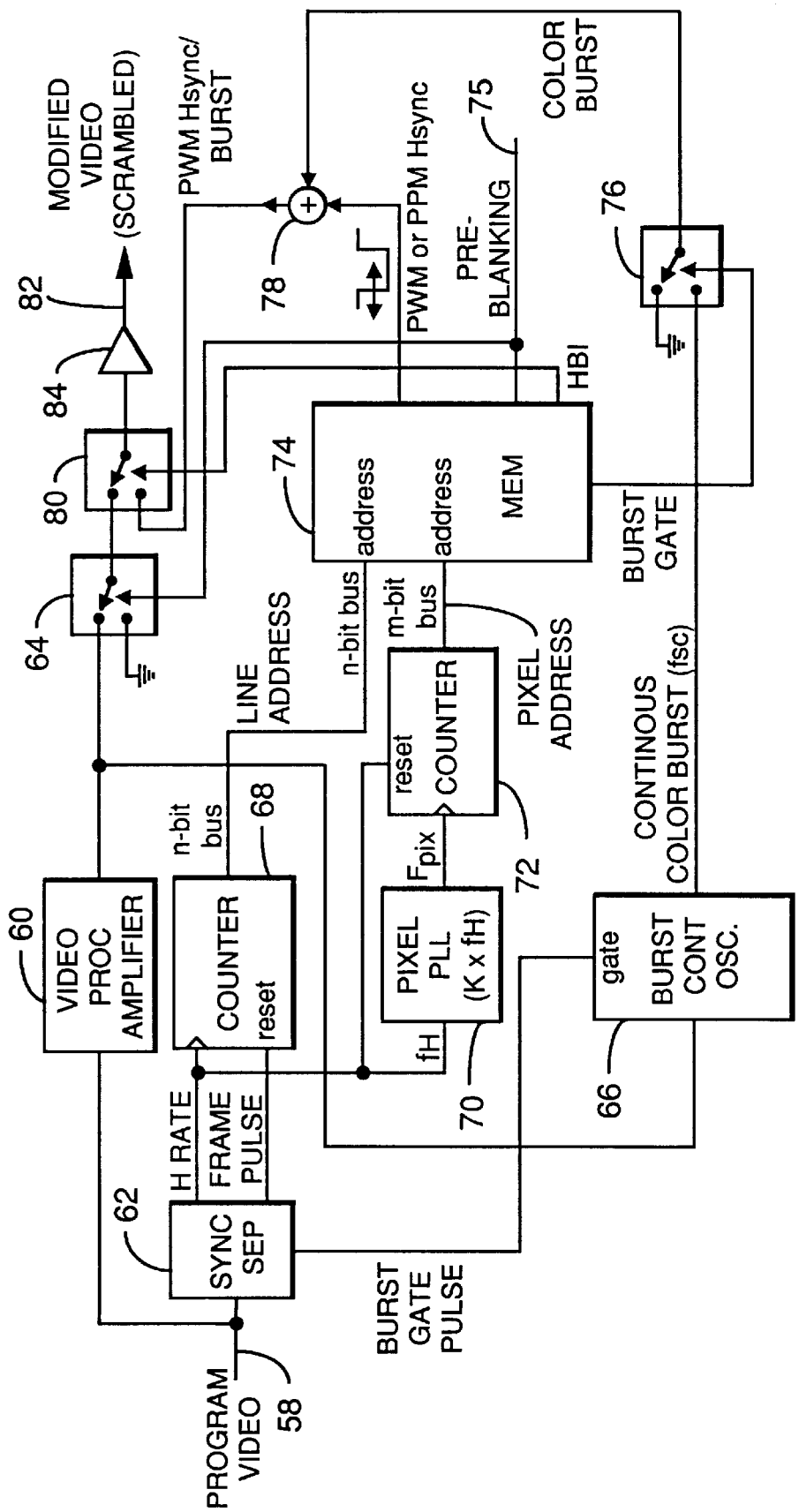
FIG. 9 is a block and schematic diagram illustrating by way of example only, circuits which provide the pulse position modulated and pulse width modulated horizontal sync pulses in accordance with the invention of FIGS. 4–8.

FIG. 9 illustrates a pulse width modulation horizontal sync overlay scrambling circuit for pulse position modulating the fixed sync pulse technique of the FIG. 4, the technique combination of fixed sync pulses of FIGS. 2 and 4, and/or for time shifting or modulating the leading edge 40 of the horizontal sync pulse 42 of the technique of FIGS. 5, 6, 7 and 8 in accordance with the invention. Thus, although the circuit of FIG. 7 is described below in terms of the modulated leading edge technique of FIGS. 5–8, it is to be understood that the circuit of FIG. 7 also may be used to accomplish the scrambling technique of FIG. 4 and the combined scrambling technique of FIGS. 2, 4, as further disclosed below. According, referring to FIG. 9, a conventional unscrambled program signal (e.g., composite video) is supplied via a lead 58 to a video processing amplifier 60 and a sync separator 62. The video processing amplifier 60 clamps the video signal to about zero volts level to establish a blanking level, and supplies the signal to one input of a switch 64 as well as to a color burst continuation oscillator 66. The other input of switch 64 is coupled to ground. The sync separator 62 supplies a horizontal rate pulse, H rate, to a clock input of a television (TV) line counter 68 and to an input of a pixel phase lock loop (PLL) 70. Sync separator 62 also supplies a frame pulse to a reset input of the counter 68, and a burst gate pulse to a gate input of the burst continuation oscillator 66. The H rate pulse also is supplied to a counter 72.

The TV line counter 68 is reset every 525 lines (in an NTSC color standard) via the frame pulse from the sync separator 62, and supplies an n-bit digital signal representing, in this example, the successive 525 lines in a TV frame, to a line address input of a memory circuit 74 formed for example of an EPROM (programmable read only memory). The output of the pixel PLL 70 is a frequency, K, multiplied by the horizontal frequency, H rate, and comprises a signal Fpix which is supplied to a clock input of the counter 72. In this NTSC example, if K is 910, the number of pixels in a TV line, then the output signal Fpix from the pixel PLL 70 is 910×15734=14.318 megahertz (MHz). The counter 72 is reset every horizontal line by the H rate pulse from the sync separator 62. In turn, the output from the counter 72 is an m-bit digital signal, representing for example 910 pixels in a TV line, which is supplied to a pixel address input of the memory circuit 74.

The memory circuit 74 supplies a pre-blanking signal to an output lead 75 for external use and to a control input of the switch 64, and a burst gate signal to a control input of a burst switch 76. The burst switch 76 receives a continuous color burst signal having a frequency of 3.58 MHz (color subcarrier) from the burst continuation oscillator 66 and, in response to the burst gate signal, supplies a regenerated color burst signal of a selected number of cycles to one input of an adder circuit 78. The memory circuit 74 also provides a pulse width modulated (PWM) or pulse position modulated (PPM) horizontal sync pulse as a function of a TV line location in the active television field, and supplies it to a second input of the adder circuit 78. The output of the adder circuit 78 is a PWM horizontal sync pulse (occurring preferably during the active TV field) together with the regenerated color burst signal. The combined signals are supplied to one input of a switch 80, whose second input is coupled to the output of the switch 64.

The memory circuit 74 also supplies a horizontal blanking interval (HBI) signal to a control input of the switch 80. The switch 80 replaces the normal horizontal sync pulse and color burst signal of the program video signal received from the switch 64, with the modulated horizontal sync pulse/color burst signal from the adder circuit 78, in response to the HBI signal from the memory circuit 74. The modified television signal is supplied on an output lead 82 via an output amplifier 84 and is in scrambled format due to the modulated horizontal sync pulse whose leading edge is modulated, or to the modulated sync pulse which is position modulated, in accordance with the invention.

The memory circuit 74 is addressed by the line counter n-bit bus that for instance, in NTSC counts 525. Thus, the n-bit bus has numbers 0 to 524 representing the 525 lines in a TV frame. Likewise the m-bit bus has numbers representing the pixel location within a TV line. For instance, if the m-bit bus counts to 910, then the m-bit bus has numbers from 0 to 909. The 0 represents the pixel location at the beginning of the horizontal blanking interval while 909 represents the last pixel of the active TV line. In any event, circuit 74 takes the m and n bit numbers into its addressing circuits and outputs various pulses as preprogrammed according to TV line number and pixel count to output (1) the HBI pulses during the active TV field, and burst gate, (2) the sync pulse whose width is changed from one TV line to another (PWM or PPM H sync) within the active TV field, and (3) the pre-blanking pulse on lead 75 during the last part of the TV lines in the active TV field.

Figure 10:
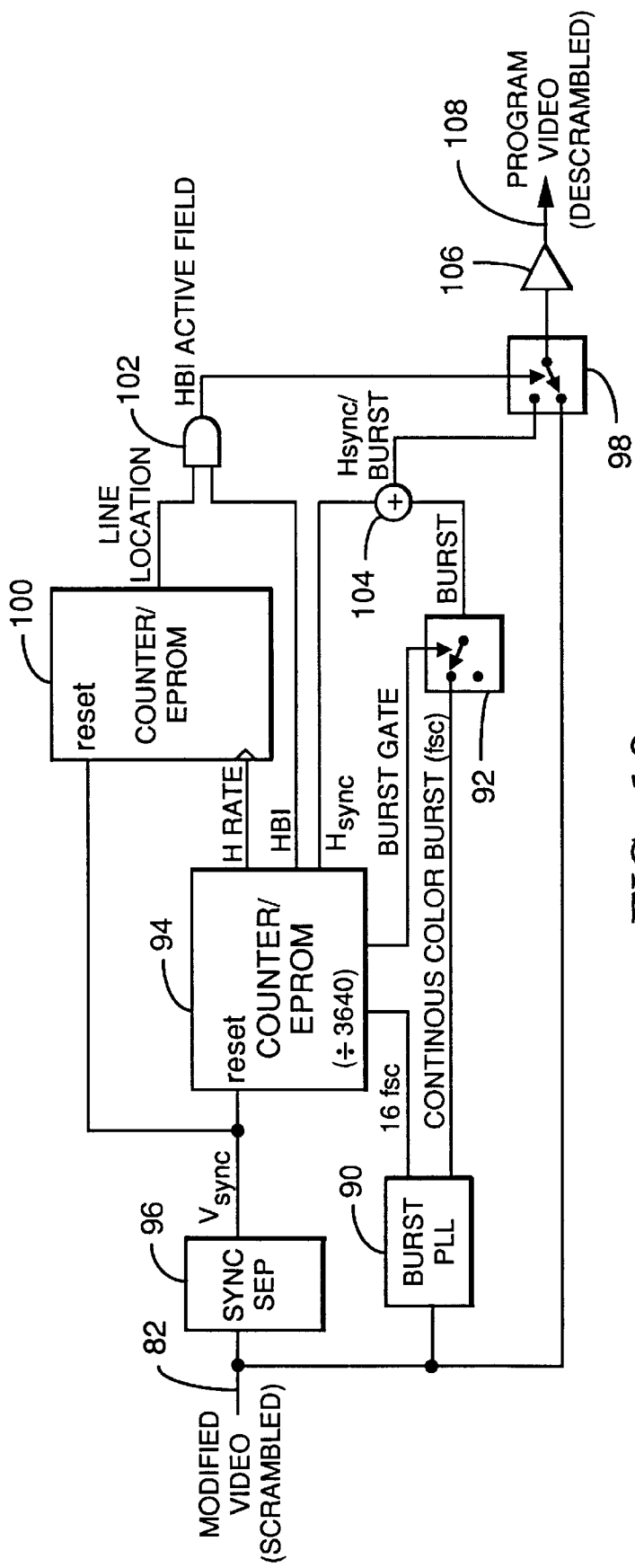
FIG. 10 is a block and schematic diagram illustrating by way of example only, circuits for descrambling a scrambled video signal in accordance with the invention, when descrambling is authorized.

FIG. 10 illustrates a PWM (or PPM) horizontal sync overlay descrambling circuit for removing the effects of the scrambling circuit of FIG. 9 when authorized. To this end, a scrambled video signal such as the signal supplied on the output lead 82 of FIG. 9, is supplied via the lead 82 to a color burst PLL/oscillator circuit 90. The circuit 90 in turn supplies a switch 92 with a continuous color subcarrier signal (fsc) of for example a frequency of 3.58 MHz for an NTSC color standard, and a signal which is a multiple of the fsc signal, i.e., 16×3.58=57.7 MHz, to an input of a counter 94. The scrambled video signal on the lead 82 also is supplied to a sync separator 96 as well as to one input of an output switch 98. The sync separator 96 supplies a vertical sync signal which is used to reset the counter 94 as well as to reset a second counter 100.

Counter 94 generates horizontal rate pulses by dividing the 16 fsc, 57.7 MHz, signal from the PLL/oscillator circuit 90 by the number 3640 (for this NTSC color standard example). The horizontal rate pulses are supplied to the clock input of the counter 100 to clock the latter. The phase of the horizontal rate pulses are reset by the vertical, i.e., frame rate, pulse supplied to the counter 94 by the sync separator 96. The counter 94 also includes a memory circuit, such as an EPROM, which supplies horizontal blanking interval (HBI) pulses during the active television field to an input of an AND gate 102, and also supplies an adder circuit 104 with stable horizontal sync pulses without pulse width or pulse position modulation. The counter 94 also supplies burst regeneration gate pulses to the control input of the switch 92.

The counter 100 supplies pulses which are coincident with the line locations of the active television field to a second input of the AND gate 102. In response to the line location pulses and the HBI pulses, the AND gate 102 supplies a control input of the output switch 98 with pulses which are coincident with the horizontal blanking intervals in the active field. The adder circuit 104 receives regenerated and thus stable color burst signals of a selected number of cycles from the switch 92 in response to the burst regeneration gate signal from the counter 94, and supplies stable horizontal sync and color burst signals to one input of the output switch 98. The other input of the switch 98 is coupled to the scrambled video signal on the input lead 82. The output switch 98, in response to the control signal from the AND gate 102, supplies a reconstructed video signal with stable horizontal sync pulses. That is, the unstable pulse width or pulse position modulated horizontal sync pulses in the scrambled video signal on the lead 82 are replaced by stable horizontal sync pulses. In addition, any position modulated color burst signals also are replaced with stable color burst signals of the selected number of cycles. The reconstructed video signal from the output switch 98 is amplified via an amplifier 106 and is supplied on an output lead 108 free of the effects of the horizontal sync overlay process applied for example via the scrambling circuit of FIG. 9.

The counter 94 essentially consists of a combination of logic circuits and various digital counters to generate timing pulses. First, a 57.7 MHz clock is applied to a divide-by-3640 counter to generate the horizontal rate pulse (H rate). This counter is reset every frame so that the timing of this horizontal rate pulse is synchronous to the video signal. This H rte signal then is used to reset other counters with the 57.7 MHz clock to generate pulses coincident with the horizontal blanking interval, HBI, and to generate the stable horizontal sync, H sync. It should be noted that counter 94 also can generate the HBI and stable horizontal sync pulse using an EPROM reset by the H rate pulse and clocked by the 57.7 MHz or 16 Fsc.

The counter 94 essentially consists of a combination of logic circuits and various digital counters to generate timing pulses. First, a 57.7 MHz clock is applied to a divide-by-3640 counter to generate the horizontal rate pulse (H rate). This counter is reset every frame so that the timing of this horizontal rate pulse is synchronous to the video signal. This H rate signal then is used to reset other counters with the 57.7 MHz clock to generate pulses coincident with the horizontal blanking interval, HBI, and to generate the stable horizontal sync, H sync. It should be noted that counter 94 also generate the HBI and stable horizontal xync pulse using an EPROM reset by the H rate pulse and clocked by the 57.7 MHz or 16 Fsc.

Figure 11:
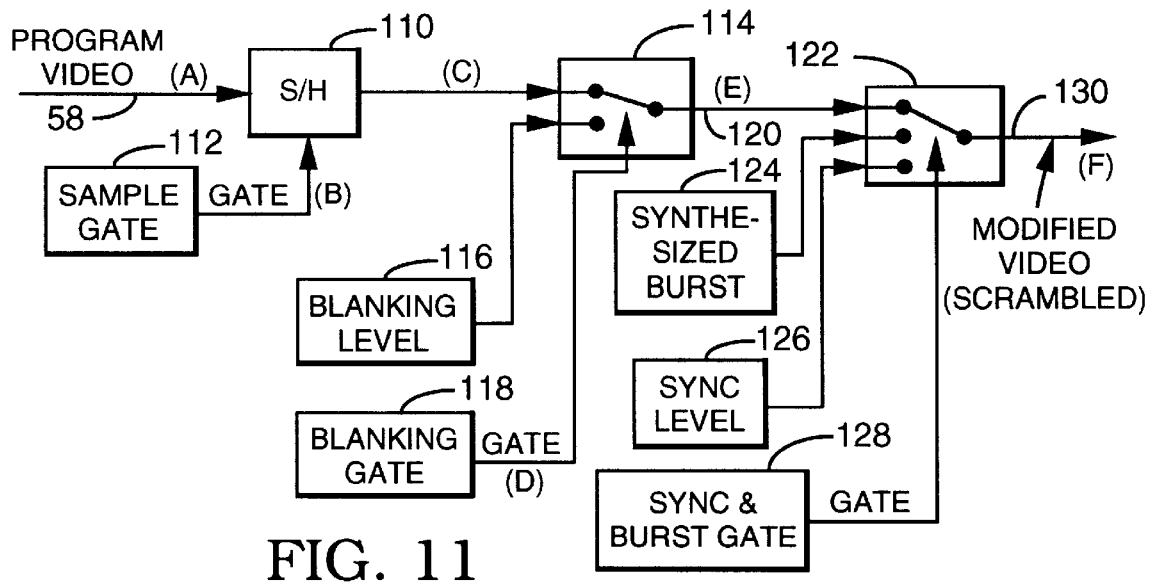
FIG. 11 is a block diagram illustrating by way of example only, circuitry for including a modulation process for the negative edge of an end of a television line, in accordance with a further embodiment of the invention.
Figure 12:
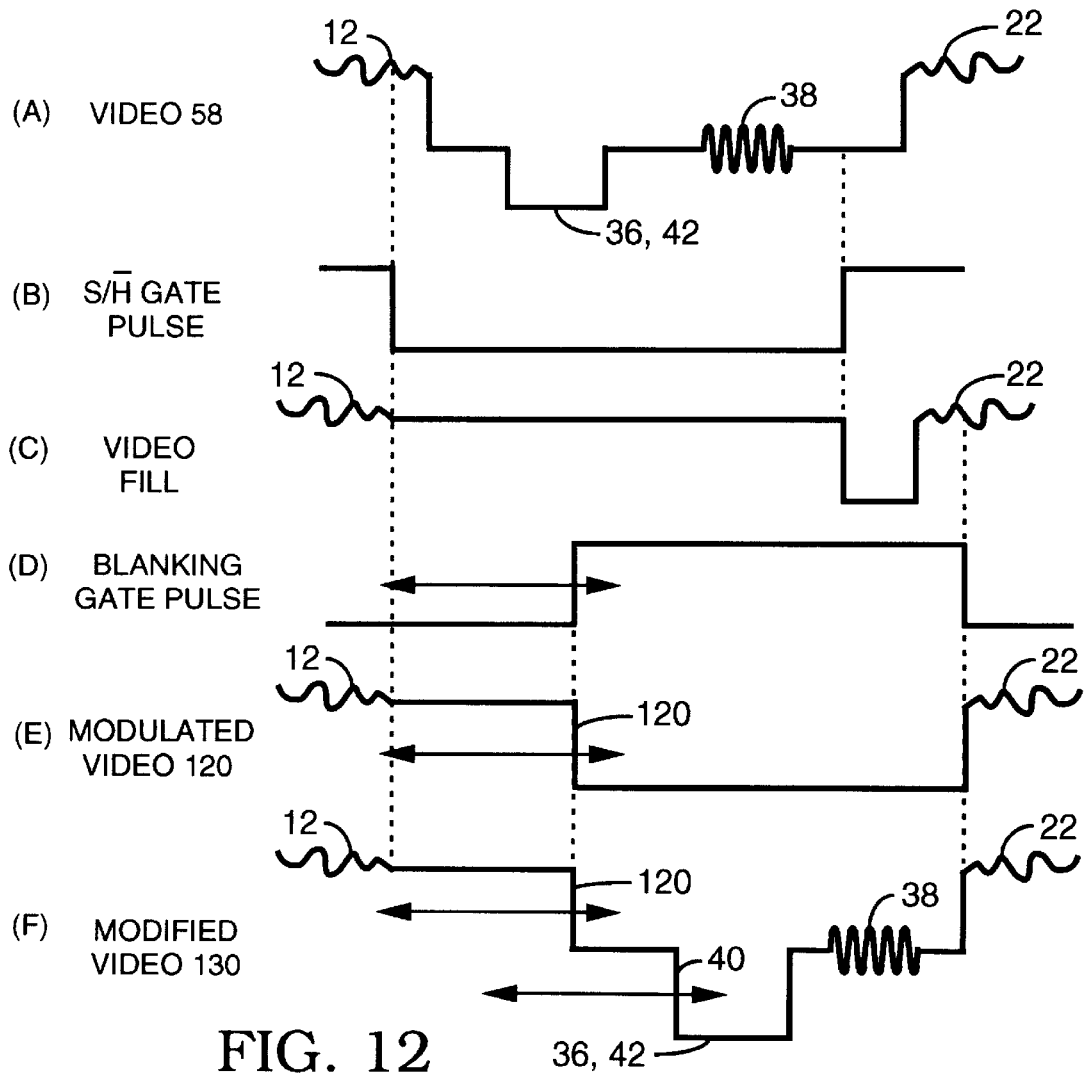
FIG. 12 are waveform diagrams depicting the signal waveforms generated at the respective points of the circuit of FIG. 11.

FIG. 11 illustrates circuitry associated with the embodiment of the invention of previous mention, wherein the negative edge of the end of the television line also is position modulated along with the pulse position and/or pulse width modulation of the sync pulse. To this end, referring to FIGS. 11 and 12, program video such as provided in FIG. 9 is supplied, for example, via the input lead 58 to a sample/hold (S/H) circuit 110. The blanking interval of the program video is depicted in FIG. 12(A). The input video is sampled via the S/H 110 in response to an end of video gate pulse from a sample gate circuit 112, for example, from 0.5 to 2 μs before the end of the active video 12 at the rising edge of the gate pulse, as depicted in FIG. 12(B). The falling edge of the gate pulse occurs just before the beginning of active video 22. The sampled level is held constant for the entire duration of the end of video gate pulse, producing what is known as a "video fill" effect, that is, stretches the sampled video level into the blanking interval. The resulting waveform is depicted in FIG. 12(C), and is supplied to an input of a switch 114.

A blanking level circuit 116 supplies a blanking level signal to a second input of the switch 114. In response to a gate pulse from a blanking gate circuit 118, depicted in FIG. 12(D), a new blanking signal is selectively inserted. That is, the blanking gate pulse selectively switches the switch 114 between the video fill effect and the blanking level signals. The leading edge of the blanking gate pulse is position modulated between a point near (0.5 to 2 μs) the end of active video and a point in the video fill region, with the falling edge occurring closely after the beginning of active video 22. The resulting waveform is depicted in FIG. 12(E) and comprises a video signal with a position modulated leading blanking edge indicated by numeral 120.

The position modulated leading blanking edge signal is supplied to an output switch 122 along with a synthesized color burst from a burst generator 124 and a sync level from a sync level generator 126. In response to a sync/burst gate pulse from a respective gate circuit 128, a new sync pulse with a position modulated leading edge and a new color burst signal are selectively added to the video from the switch 114, resulting in a modified video signal on an output lead 130 which is depicted in FIG. 12(F). For convenience, the position modulation of the leading edge of the blanking waveform 120 and the position modulation of, for example, the leading edge 40 of the sync pulse, preferably are synchronized and locked, so that the time between the two modulating edges is constant on all television lines.

Although the invention has been described herein relative to specific embodiments, various additional features and advantages will be apparent from the description and drawings. For example, although specific waveforms, frequencies, pixel and line numbers, division numbers, etc., commensurate with a NTSC television color standard are employed herein for purposes of description, it is to be understood that other waveforms, frequencies and numbers pertinent to other color standards such as PAL and SECAM may be used instead. Likewise, the specific circuits disclosed in the scrambling/descrambling diagrams of FIGS. 9, 10 are for purposes of example only and may be selectively replaced by other respective circuits. In addition, although the description is concerned with video signals, the invention may be used with other data signals of similar characteristics such as, for example, video or audio signals, or the like which contain synchronizing signals, wherein it is desired to conceal the signal from use by unauthorized persons. Likewise, the techniques of the invention also are applicable to pulse width and pulse position modulation of vertical sync pulses in respective vertical blanking intervals to achieve vertical sync overlay scrambling concealment.

In further modifications of the invention, the modulation described above may be random, pseudo random and/or periodic in frequency and amplitude, to optimize the corresponding concealment provided by the horizontal sync overlay processes. Also, to increase the concealment in the vertical direction, fake end of field and/or beginning of field pulses near the vertical blanking interval that are longer than normal horizontal sync pulse widths may be inserted randomly, pseudo randomly and/or periodically. Still further, as mentioned above, the pulse width modulation technique of the invention (for example, FIGS. 5, 6) further contemplates the time shifting of the trailing edge (44) of the horizontal sync pulse and/or both the leading and trailing edges (40, 44). Thus it is intended that the scope of the invention be defined by the following claims and their equivalents.

What is claimed is:

1. A method of optimizing the scrambling concealment of a video signal when viewed on a television screen, the video signal including ends of television lines thereof; comprising the steps of:

generating a horizontal sync signal with a leading and a trailing edge during a horizontal blanking interval of a television line of the video signal;

time shifting the location of an edge of the horizontal sync signal relative to the beginning of the horizontal blanking interval to provide the video signal with an unstable horizontal sync pulse which causes a correspondingly unstable and thus concealed video signal when the video signal is displayed on the television screen;

wherein the step of time shifting includes pulse width modulating the leading edge from about 2.4 microseconds (μs) through about 6.9; and wherein the step of time shifting includes maintaining the trailing edge of the horizontal sync pulse stationary while modulating the leading edge.

2. The method of claim 1 wherein the leading edge is modulated from line-to-line at a predetermined programmed frequency.

3. The method of claim 1 including the step of time shifting the ends of selected television lines in selected relationship to the time shifting of the horizontal sync signal.

4. A method of optimizing the scrambling concealment of a video signal when viewed on a television screen, the video signal including ends of television lines thereof. comprising the steps of:

generating a horizontal sync signal with a leading and a trailing edge during a horizontal blanking interval of a television line of the video signal;

time shifting the location of an edge of the horizontal sync signal relative to the beginning of the horizontal blanking interval to provide the video signal with an unstable horizontal sync pulse which causes a correspondingly unstable and thus concealed video signal when the video signal is displayed on the television screen; and wherein the step of time shifting includes pulse position modulating a horizontal sync pulse of a width of about 2.4 to 3 plus microseconds.

5. The method of claim 4 including the step of time shifting the ends of selected television lines in selected relationship to the pulse position modulation.

6. The method of claim 1 including the step of:

pre-blanking a time interval at the end of a television line and prior to the modulated horizontal sync pulse to force the detection of the resulting time shifted leading edge of the horizontal sync pulse.

7. A method of optimizing the scrambling concealment of a video signal when viewed on a screen of a television set, the video signal including selected blanking intervals in television lines thereof, comprising the steps of:

generating a sync signal of a width of at least 2.4 microseconds (μs) within the blanking interval;

selectively modulating the sync signal relative to the beginning of the blanking interval to provide an unstable sync signal within the video signal; and causing the television set to lock onto the unstable modulated sync signal to derive a correspondingly modulated and thus concealed video signal when viewed on the screen.

8. The method of claim 7 wherein descrambling of the scrambled video signal is authorized, including the steps of:

generating a stable horizontal sync signal; and replacing the unstable horizontal sync signal with the stable horizontal sync signal to provide a stable television picture when displayed on the screen.

9. The method of claim 7 wherein the sync signal width is about 3 μs or larger, and the sync signal is pulse position modulated over an interval of about ±2 μs.

10. The method of claim 9 including the step of:

modulating ends of selected television lines in predetermined relationship to the pulse position modulation.

11. The method of claim 9 wherein the blanking interval includes a back porch interval and a color burst signal of color subcarrier, and wherein the back porch interval is reduced to about 2 μs and the color burst signal is reduced to about 3 to about 5 cycles of color subcarrier to provide an increased time interval for sync signal position modulation.

12. The method of claim 7 wherein the sync signal is a horizontal sync pulse within a horizontal blanking interval, and the horizontal sync pulse includes leading and trailing edges.

13. The method of claim 12 wherein the step of selectively modulating includes time shifting the location of at least the leading edge relative to the beginning of the horizontal blanking interval to cause the television set to lock onto the time shifting edge of the horizontal sync pulse when an attempt is made to view a copy of the thusly scrambled video signal.

14. The method of claim 13 including the step of:

time shifting ends of selected television lines in predetermined relationship to the time shifting of the at least leading edge of the horizontal sync pulse.

15. The method of claim 7 including the step of:

pre-blanking the horizontal blanking interval for a predetermined time interval at an end of a television line and prior to the time shifted location of the leading edge of the horizontal sync pulse, to insure that the television set locks onto the time shifted leading edge.

16. The method of claim 15 wherein the predetermined time interval of pre-blanking is about 0.5 to 2 μs.

17. The method of claim 7 wherein:

the step of generating includes generating a first narrow sync signal of about 2.3 μs and a second wider sync signal of about 3 μs or larger;

the step of pulse modulating includes;

pulse modulating the first sync signal over successive television lines for a first selected time period of the video signal;

thereafter pulse modulating the second sync signal over successive television lines for a second selected time period of the video signal; and the step of causing includes causing the television set to first lock onto the modulated first sync signal for the first selected time period and to thereafter lock onto the modulated second sync signal for the second selected time period, to derive a concealed video signal on the screen, which signal is successively scrambled by said first and second sync signals.

18. The method of claim 17 wherein the time period is formed of one or more fields or frames or a fraction of a field or frame of the video signal.

19. The method of claim 18 wherein the number and occurrence of the fields or frames is programmed to provide periodic, varying or random selection thereof.

20. Apparatus for optimizing the scrambling concealment of a video signal when viewed on a screen of a television set, the video signal including a blanking interval at an end of a television line, comprising:

means for providing a sync pulse of a width of at least 2.4 microseconds (μs) in the blanking interval, the sync pulse including a leading and a trailing edge; and means for selectively modulating said sync pulse relative to the beginning of the blanking interval over a predetermined positional displacement to insure that the television set locks onto the modulating sync pulse to thus present the concealed video signal on the screen.

21. The apparatus of claim 20 wherein the means for modulating modulates an edge of the sync pulse relative to the beginning of the blanking interval from line-to-line at a predetermined frequency.

22. The apparatus of claim 21 wherein the means for modulating modulates the position of the leading edge of the sync pulse while maintaining the trailing edge stationary.

23. The apparatus of claim 22 wherein the leading edge is modulated from about 6.9 through about 2.4 μs.

24. The apparatus of claim 21 wherein the means for modulating modulates both edges of the sync pulse.

25. The apparatus of claim 20 wherein the means for modulating also modulates a negative edge of the end of the television line in selected relationship to the sync pulse modulation.

26. The apparatus of claim 25 wherein the negative edge modulation is locked to the sync pulse modulation.

27. The apparatus of claim 20 wherein the means for selectively modulating includes:

means for pulse width or pulse position modulating the sync pulse during the blanking interval of a television line; and means for inserting the pulse width or pulse position modulated sync pulse into the blanking interval of the television line to provide the concealed video signal when viewed on the screen.

28. The apparatus of claim 27 wherein the means for pulse width or pulse position modulating includes:

means for generating a line location signal;

means for generating a pixel location signal; and memory means responsive to the line and pixel location signals for supplying the pulse width or pulse position modulated sync pulse.

29. The apparatus of claim 28 wherein the video signal includes an original sync pulse and color burst signal in the television line, the apparatus including:

means for producing a regenerated color burst signal; and wherein the inserting means includes;

switch means receiving the pulse width or pulse position modulated sync pulse and the regenerated color burst signal for replacing the original sync pulse and color burst signal with the modulated sync pulse and the regenerated color burst signal in response to the presence of the blanking interval.

30. The apparatus of claim 27 wherein the pulse width or pulse position modulating means pulse width modulates at least the leading edge of the sync pulse over a time interval of about 6.9 to about 2.4 μs.

31. The apparatus of claim 27 wherein the means for providing the sync pulse provides a sync pulse of a width of about 3 μs or more and the pulse width or pulse position modulating means pulse position modulates the 3 μs or more sync pulse.

32. The apparatus of claim 31 wherein:

the means for providing a sync pulse provides a second sync pulse of a width of about 2.3 μs;

the modulating means modulates the 3 μs or more sync pulse on a line-by-line basis for a first time period of the video signal, and then modulates the second sync pulse on a line-by-line basis for a second time period of the video signal; and the inserting means inserts the modulated 3 µs or more sync pulse and the second sync pulse into the blanking interval of respective television lines over the respective first and second time periods.

33. The apparatus of claim 32 wherein the modulating means includes:

means for generating a line location signal;

means for generating a pixel location signal; and memory means responsive to the line and pixel location signals for inserting the consecutive 3 µs or more and the second sync pulses in respective first and second time periods.

34. The apparatus of claim 27 including:

means for providing a pre-blanking signal at the start of the blanking interval; and means for establishing a pre-blanking time interval prior to the pulse width modulated sync pulse in response to the pre-blanking signal.

35. The apparatus of claim 27 further including apparatus for removing the effects of the scrambling concealment apparatus when descrambling of the video signal is authorized, comprising:

means for producing an active field blanking interval signal and a stable sync pulse; and means for replacing the sync pulse having the modulated leading edge with the stable sync pulse, in response to the active field blanking interval signal.

36. The apparatus of claim 35 wherein:

said means for producing includes first counter means for supplying a line location signal and second counter means for supplying a blanking interval signal;

logic means responsive to the line location and blanking interval signals for producing said active field blanking interval signal; and said second counter means producing said stable sync pulse for said means for replacing.

37. The apparatus of claim 20 including:

second means for modulating a negative edge of the end of the television line in selected relationship to the sync pulse modulation, said second means including;

sample/hold means for selectively sampling and holding a video level signal at the end of the television line;

means for inserting a new blanking signal into the video level signal while position modulating the leading edge of the new blanking signal; and means for adding a new sync pulse and color burst signal to the video level signal and the edge modulated new blanking signal, to provide the modulated negative edge of the television line with the sync pulse modulation.

38. The apparatus of claim 37 wherein:

said sample/hold means includes means for supplying a sample gate pulse at the end of the television line;

said means for inserting the new blanking signal includes means for supplying a blanking level signal whose leading edge is position modulated during a selected portion of the blanking interval; and said means for adding includes means for generating a synthesized color burst and new sync pulse and means for supplying a sync/burst gate pulse for adding the synthesized color burst and new sync pulse to the video level signal.

39. A method of optimizing scrambling concealment of a video signal when viewed on a screen of a television set, the video signal including a selected sync pulse within a respective blanking interval of a line of the video signal, comprising the steps of:

generating the sync pulse with a minimum pulse width of about 2.4 microseconds duration; and selectively modulating the sync pulse a minimum of ±2 microseconds relative to the beginning of the blanking interval at a modulating frequency of about 200 through 1000 megahertz, to provide the video signal with an unstable sync pulse which causes a corresponding modulation in a copy of the video signal when it is displayed on the screen.

40. The method of claim 39 including the step of:

generating the blanking interval with a reduced back porch interval of about 2 microseconds duration and a reduced color burst of about 3 through 5 cycles within the reduced back porch.

41. The method of claim 39 wherein the step of modulating includes:

pulse position modulating the sync pulse at a selected frequency from line-to-line relative to a beginning of the respective blanking interval.

42. The method of claim 39 wherein the step of modulating includes:

modulating an edge of the sync pulse at a selected frequency from line-to-line.

43. The method of claim 42 wherein the step of modulating includes:

modulating a leading edge of the sync pulse at the selected frequency from line-to-line relative to a beginning of the respective blanking interval while maintaining a trailing edge stationary.

44. The method of claim 42 wherein the step of modulating includes:

pulse position modulating a sync pulse of a width of about 2.4 to 3 plus microseconds relative to the beginning of the blanking interval.

45. The method of claim 42 including the step of:

establishing a pre-blanked interval of about 0% through 20% of peak white level prior to the start of the sync pulse.

46. The method of claim 42 wherein the sync pulse is a horizontal sync pulse within a horizontal blanking interval, and a leading edge is modulated over a time interval of about 6.9 to 2.4 microseconds.

47. The method of claim 42 wherein the step of generating the sync pulse includes the steps of:

generating an n-bit digital signal indicative of a line location signal;

generating an m-bit digital signal indicative of a pixel location signal; and generating a pulse position or width modulating signal representative of a position displacement of the sync pulse or of said edge of the sync pulse.

* * * * *